US008242406B2

(12) United States Patent
Schreiber et al.

(10) Patent No.: US 8,242,406 B2
(45) Date of Patent: Aug. 14, 2012

(54) METHOD FOR THE MANUFACTURE OF A BLISK

(75) Inventors: Karl Schreiber, Am Mellensee (DE); Hermann Mohnkopf, Rangsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 624 days.

(21) Appl. No.: 12/453,624

(22) Filed: May 15, 2009

(65) Prior Publication Data

US 2009/0283503 A1    Nov. 19, 2009

(30) Foreign Application Priority Data

May 15, 2008    (DE) .......................... 10 2008 023 755

(51) Int. Cl.
*B23K 26/20* (2006.01)
*B23P 15/04* (2006.01)

(52) U.S. Cl. .......... 219/121.64; 219/121.84; 219/121.85

(58) Field of Classification Search ...... 219/121.63–121.66, 121.85; 29/889.21
See application file for complete search history.

(56) References Cited

U.S. PATENT DOCUMENTS

| | | | | |
|---|---|---|---|---|
| 2,630,514 A | * | 3/1953 | Schaefer | ........................ 219/73 |
| 4,096,615 A | * | 6/1978 | Cross | ........................ 29/889.21 |
| 5,156,321 A | * | 10/1992 | Liburdi et al. | ................ 228/119 |
| 5,797,182 A | * | 8/1998 | Furlan et al. | ................ 29/889.21 |
| 5,873,703 A | | 2/1999 | Kelly et al. | |
| 6,219,916 B1 | | 4/2001 | Walker | |
| 6,269,540 B1 | | 8/2001 | Islam et al. | |
| 2005/0118330 A1 | | 6/2005 | Clark | |
| 2007/0281175 A1 | * | 12/2007 | Hoffmann et al. | ............ 428/457 |
| 2008/0003453 A1 | | 1/2008 | Ogren | |
| 2008/0023531 A1 | * | 1/2008 | Schaeffer et al. | ............ 228/225 |
| 2009/0001141 A1 | | 1/2009 | Spriestersbach | |

FOREIGN PATENT DOCUMENTS

| | | |
|---|---|---|
| DE | 10 2006 049 216 A1 | 4/2008 |
| EP | 0 070 177 A1 | 1/1983 |
| EP | 1 749 616 A1 | 2/2007 |
| EP | 1 790 745 A1 | 5/2007 |
| EP | 1 535 692 B1 | 7/2007 |
| EP | 1894658 | 3/2008 |
| WO | WO 05/0 70 601 A1 | 8/2005 |

OTHER PUBLICATIONS

European Search Report dated Aug. 27, 2009 from counterpart European patent application.

* cited by examiner

*Primary Examiner* — Samuel M Heinrich
(74) *Attorney, Agent, or Firm* — Timothy J. Klima; Shuttleworth & Ingersoll, PLC

(57) ABSTRACT

A method for manufacturing integrally bladed rotors by laser brazing a rotor disk (1) made of a nickel or titanium-base material to blades (3) made of titanium aluminide. A brazing metal similar to the blade material is used, which is introduced into the laser beam (4) as brazing power jet (5) and whose heat capacity, which is controlled by the melting temperature and the volume of the molten metal bath This provides for melting of the disk material and alloying with this material, but not for melting of the blade material, to which it is connected by adhesion. Such blisk features a low blade weight, reduced centrifugal effects and enhanced service life.

16 Claims, 1 Drawing Sheet

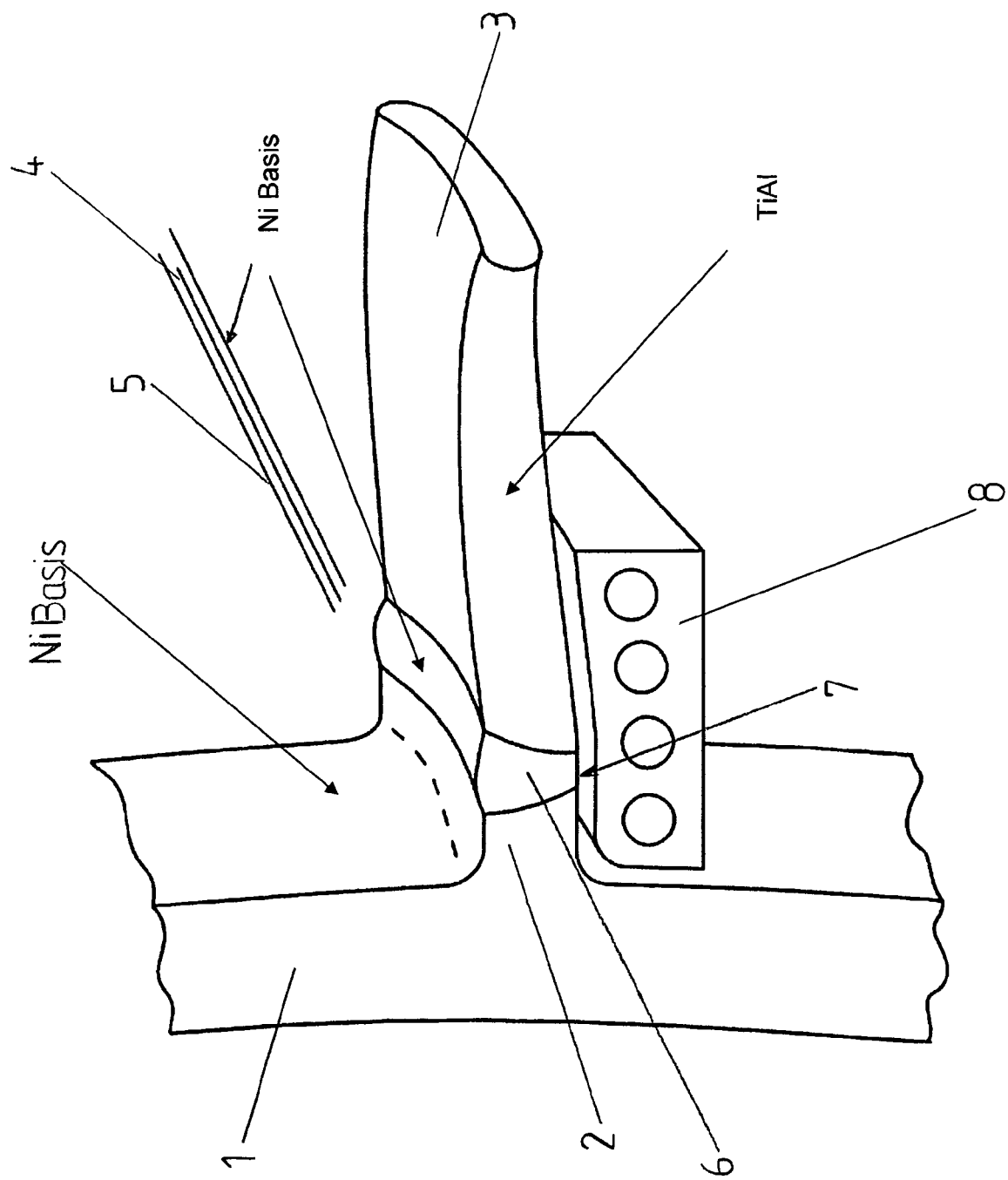

METHOD FOR THE MANUFACTURE OF A BLISK

This application claims priority to German Patent Application DE102008023755.8 filed May 15, 2008, the entirety of which is incorporated by reference herein.

The present invention relates to a method for the manufacture of a blisk for the high-pressure compressor or the low-pressure turbine of a gas-turbine engine, in which pre-manufactured blades are connected to a pre-manufactured rotor disk in a joining process by positive-substance joining.

Integrally bladed rotors used in engine manufacture, which are also termed "blisks", are characterized by lower weight and higher mechanical loadability, as well as by optimum flow guidance and high efficiency, as compared with conventional rotors with blades detachably mounted on the rotor disk.

As is generally known, blisk-type rotors are manufactured by milling from a solid material. Although milling of the blades from a blade blank offers various design options, it requires very high work and material investment. Moreover, a material selection which accounts for the different mechanical and thermal loading situations in the disk area and in the blade area is not possible or possible only to a limited extent.

Furthermore, integrally bladed rotors can also be produced in that separately manufactured disks and blades are connected by positive-substance joining, i.e. in a welding process. The manufacture of blisks by linear friction welding, as described for example in U.S. Pat. No. 6,219,916 or EP 1 535 692, is restricted to a certain component design and to large-size blades and, moreover, requires a complex fixture concept. A joint between rotor disk and blades produced by conventional fusion welding is disadvantageous in that, due to the susceptibility to cracking in the weld area, the required strength properties and a long service life of the blisk are not ensured.

In addition, the known joining processes require that the rotor disk and the blades be made of the same, or at least similar material to obtain the necessary strength properties in the zone of the weld. In fact, the requirements on the properties of the blades and the disk differ quite considerably in that the blades are exposed to high-cycle fatigue (HCF) and erosion as well as higher thermal loading, while the disk material has to meet higher requirements on low cycle fatigue (LCF) and creep strength. Blades and disks made of different classes of material with such different properties are not joinable with the conventional welding processes as the joint would have insufficient strength properties.

A broad aspect of the present invention is to provide a method of the type specified at the beginning above for the manufacture of integrally bladed rotors for a gas-turbine engine, which ensures the mechanical and thermal requirements specified for the disk and blade area as well the joining area and a long service life of the blisk.

The present invention, provides for a pre-manufactured rotor disk made of a nickel or titanium-base material to be joined to blades made of titanium aluminide by way of laser brazing. The brazing metal is a powdered material of nickel, iron or copper base. The laser beam only heats and melts the brazing powder jet introduced into the laser beam, while the blade, in particular, is shielded against the laser beam by the brazing powder jet. The members to be joined are heated at the joint by the molten brazing metal, actually in dependence of the volume of the molten brazing metal controlled by the size of the brazing gap and the melting temperature of the brazing metal. The brazing powder or its melting temperature, respectively, and the size of the bath of molten brazing metal are, in dependence of the disk and blade material, selected such that the disk material is molten in the joining area and alloys with the similar brazing metal, while the blade material is not molten and the connection with the solidifying, dissimilar brazing metal is made by adhesion.

A blisk so produced will conform to the mechanical and thermal load conditions applicable to the disk and blade area. Since blades made of titanium aluminide are light in weight, the centrifugal forces acting upon the joint and, consequently, the mechanical load in this area will be comparatively low, ensuring a long service life of the blisk produced with relatively low work and material input.

The melting temperature of the brazing powder is governed by the nickel-base material and, if applicable, an addition made thereto to lower the melting temperature. The volume of the bath of molten brazing metal, whose heat capacity also acts upon the two members to be joined and influences the heating thereof, as well as the formation of the respective joint, is defined by the shape and size of the brazing gap. Preferably, the brazing gap is open at the root and has a width which corresponds to approximately half the depth of the brazing gap.

In development of the present invention, a boron addition is preferably used to lower the melting temperature.

In a further development of the present invention, the nickel-base material used as brazing metal has higher ductility than the nickel-base material of the rotor disk. Owing to the good ductility of the brazing metal, whose strength upon solidification is lower than that of titanium aluminide, only small forces are introduced into the blade material upon solidification of the molten brazing metal. Thus, mechanical and thermal stresses in the blade material caused by the solidification of the brazing metal are reduced or absorbed by the brazing metal.

In a further development of the present invention, the blades are attached to blade stubs formed on the periphery of the disk to avoid a notch effect immediately on the disk and the stresses resulting therefrom.

An embodiment of the present invention is described hereunder in more detail with reference to the accompanying drawing.

FIG. 1 shows a partial view of a rotor disk with a blade attached to a blade stub by way of laser brazing.

The rotor disk 1 is made of a nickel-base alloy which is creep and fatigue-resistant also at high temperatures, here for example IN 718, and is peripherally provided with small blade stubs 2 by which the blades 3 are to be attached to the rotor disk 1. The blades 3 are made of γ-titanium aluminide, i.e. an intermetallic combination of titanium and aluminide. Compared with the nickel-base disk material, titanium aluminide is characterized by substantially lower weight, higher temperature resistance and, despite a low density, has good strength and stiffness properties. The joint between the blade stubs 2 provided on the disk periphery and the respective blade 3 is made by laser brazing, i.e. by using a nickel-base brazing powder jet 5 blown into a laser beam 4 and molten at approx. 1400° C. The laser beam 4 only acts upon and melts the brazing powder, while the titanium aluminide of the blade is shielded against the heat effect of the laser beam 4 by the brazing powder jet 5. The brazing metal, whose ductility can be higher than that of the disk material and whose melting point can be lowered by an addition of boron, has a lower strength upon solidification than titanium aluminide. The forces and thermal stresses occurring upon solidification are absorbed by the brazing metal, as a result of which only small forces are introduced into, and only small stresses produced in the titanium aluminide blade and, finally, the latter is not affected by the force and thermal effects induced by the brazing metal.

In the brazing process, the heat introduced into the two joining members 2, 3 is adjusted by setting the melting point of the brazing metal and the volume of the molten metal bath governed by the brazing metal supply and the braze joint dimensions in such a manner that, in the joining area, the nickel-base material of the blade stub 2 at the rotor disk 1 is molten and alloys with the molten brazing metal, while the titanium aluminide of the blade 3 is not molten and merely the adhesion required for a firm connection is here attained between the solidified brazing metal and the non-molten titanium aluminide. This means that an alloy is formed between the similar nickel-base materials of the rotor disk 1 with formed-on blade stub 2 and the brazing metal, while the formation of an alloy between the titanium aluminide and the brazing metal—which would be brittle and cause the separation of the blades 3—is positively avoided. The volume of the molten metal bath provided for heat control and temperature setting, respectively, in the joining area is set via the size of the braze joint 6 (the brazing gap) whose joint width corresponds to approximately half the joint depth and which has a certain root opening 7. The molten metal bath is backed beneath the root opening 7 by a water-cooled bath support 8 made of copper. By connecting the blades 3 to the blade stubs 2 provided on the disk periphery, the formation of notches, and the generation of corresponding stresses, immediately in the rotor disk 1 is avoided.

LIST OF REFERENCE NUMERALS

1 Rotor disk
2 Blade stub
3 Blade
4 Laser beam
5 Brazing powder jet
6 Braze joint
7 Root opening
8 Bath support

What is claimed is:

1. A method for manufacturing a blisk of a gas-turbine engine, comprising:
    laser brazing a plurality of pre-manufactured blades made of titanium aluminide to a pre-manufactured rotor disk made of at least one of a nickel base material and a titanium base material using a brazing metal of at least one of nickel base, iron base and copper base;
    wherein a heating of the members to be joined is controlled in relation to a melting temperature of the brazing metal and a volume of a molten metal bath such that the material of the rotor disk is molten and alloys with the similar brazing metal, while the material of each blade is not molten and a connection with the brazing metal is made by adhesion.

2. The method of claim 1, and further comprising generating the molten brazing metal by introducing a brazing powder jet into a laser beam, with the brazing powder jet shielding at least the blade made of titanium aluminide against the laser beam such that only the brazing metal is heated and molten by the laser beam.

3. The method of claim 2, and further comprising varying a width of a brazing gap to set the volume of the molten metal bath.

4. The method of claim 3, wherein the brazing gap is open at a root thereof and has a width which corresponds to approximately half a depth of the brazing gap.

5. The method of claim 4, and further comprising backing the molten metal bath with a water-cooled bath support.

6. The method of claim 5, wherein a ductility of the brazing metal is higher than a ductility of the similar disk material.

7. The method of claim 6, and further comprising adjusting the melting temperature of the brazing metal by an addition to the brazing material.

8. The method of claim 7, and further comprising lowering the melting temperature of the brazing material by adding boron to the brazing material.

9. The method of claim 8, and further comprising brazing the blades to blade stubs formed on the periphery of the rotor disk to avoid stresses induced by notch effects.

10. The method of claim 1, and further comprising varying a width of a brazing gap to set the volume of the molten metal bath.

11. The method of claim 10, wherein the brazing gap is open at a root thereof and has a width which corresponds to approximately half a depth of the brazing gap.

12. The method of claim 1, and further comprising backing the molten metal bath with a water-cooled bath support.

13. The method of claim 1, wherein a ductility of the brazing metal is higher than a ductility of the similar disk material.

14. The method of claim 1, and further comprising adjusting the melting temperature of the brazing metal by an addition to the brazing material.

15. The method of claim 14, and further comprising lowering the melting temperature of the brazing material by adding boron to the brazing material.

16. The method of claim 1, and further comprising brazing the blades to blade stubs formed on the periphery of the rotor disk to avoid stresses induced by notch effects.

* * * * *